United States Patent [19]
Azamatov et al.

[11] Patent Number: 4,886,292
[45] Date of Patent: Dec. 12, 1989

[54] ELASTIC SUSPENSION OF A WHEELED VEHICLE

[75] Inventors: Ramil A. Azamatov, Brezhnev; Mikhail N. Zamitter, Kiev; Evgeny M. Zema, Sinelnikovo; Vladimir A. Nedorezov, Sinelnikovo; Anatoly K. Oblovatsky, Sinelnikovo, all of U.S.S.R.

[73] Assignee: Kievsky Inzhenerno-Stroitelny Institut, Kiev, U.S.S.R.

[21] Appl. No.: 241,977

[22] PCT Filed: Nov. 28, 1986

[86] PCT No.: PCT/SU86/00123
§ 371 Date: Jul. 25, 1988
§ 102(e) Date: Jul. 25, 1988

[87] PCT Pub. No.: WO88/03880
PCT Pub. Date: Jun. 2, 1988

[51] Int. Cl.⁴ .......................... B60G 5/00; B60G 11/04
[52] U.S. Cl. ..................... 280/718; 280/680; 280/686
[58] Field of Search ............... 280/680, 686, 718; 267/43, 45, 52

[56] References Cited

U.S. PATENT DOCUMENTS

| | | | |
|---|---|---|---|
| 2,304,780 | 12/1942 | de Fries | 267/38 |
| 3,031,203 | 4/1962 | Christenson et al. | 267/45 |
| 3,883,125 | 5/1975 | Takatsu | 267/45 |
| 4,570,970 | 2/1986 | Burfiend | 280/680 |
| 4,633,564 | 1/1987 | Sauber | 280/718 |

FOREIGN PATENT DOCUMENTS

| | | | |
|---|---|---|---|
| 1199145 | 8/1965 | Fed. Rep. of Germany | |
| 666209 | of 0000 | France | 280/718 |
| 2075441 | 11/1987 | United Kingdom | 280/718 |

OTHER PUBLICATIONS

"The Kamaz Truck", by I. M. Jurkovsky and V. A. Tolpygin, Moscow, the Dosaaf Publishers, 1975, pp. 227–, no translation.

Primary Examiner—Kenneth R. Rice
Attorney, Agent, or Firm—Lilling & Greenspan

[57] ABSTRACT

An elastic suspension of a vehicle having a frame with at least one axle includes a lamination (3) of leaf springs interposed between the frame (1) and axle (2) and mechanically connected thereto. A plate bracelike spring (4) extends lengthwise of the lamination (3) of leaf springs. The adjacent mid portions (5,6) of the lamination (3) of leaf springs and plate bracelike spring (4) are mechanically interconnected by means of a fastening assembly (7).

6 Claims, 2 Drawing Sheets

ELASTIC SUSPENSION OF A WHEELED VEHICLE

BACKGROUND OF THE INVENTION

1. Field of the Invention

This invention relates to devices for absorbing dynamic loads, and more particularly to elastic suspensions of wheeled vehicles.

2. Description of the Prior Art

The presently widely expanding use of wheeled vehicles, as well as their increasing number and variety of functional designations, necessitate higher speeds thereof in laden and unladen state, and greater net loads carried thereby, preferably accompanied by fuel economy.

There is known an elastic suspension of a wheeled vehicle having a frame with at least one axle (cf. e.g., "The KamAZ Truck" by I. M. Jurkovsky and V. A. Tolpygin, Moscow, the DOSAAF Publishwers, 1975, p. 227) comprising a lamination of springs interposed between the frame and axle of the vehicle and mechanically connected thereto.

However, the use in this suspension of a plurality of laminated springs results in linear resilient characteristics of the suspension, which affects the riding performance of the vehicle under certain road surface conditions.

In addition, the spring lamination includes a number spring sufficient to withstand the entire vertical load exerted on the wheels, which results in much metal being consumed for fabricating the suspension.

Another disadvantage of the above prior art suspension resides in that fabrication and assembly of spring the lamination containing a plurality of springs is labour consuming.

It is therefore an object of the present invention to provide an elastic suspension of a wheeled vehicle capable of improving the riding performance of the vehicle.

Another object of the invention is to reduce the amount of metal consumed for fabricating the elastic suspension of a wheeled vehicle.

One more object of the invention is to make fabrication and assembly of the elastic suspension of a wheeled vehicle less labour consuming.

SUMMARY OF THE INVENTION

The invention aims at providing an elastic suspension of a wheeled vehicle having such additional elements which would ensure a predetermined non-linear, resilient characteristic of the suspension, reduce the amount of metal consumed for its fabrication, make the fabrication less labour-consuming and simplify the assembly of the suspension.

The aims of the invention are attained by an elastic suspension of a wheeled vehicle having a frame with at least one axle comprising a lamination of leaf springs interposed between the frame and axle and mechanically connected thereto. According to the invention, the elastic suspension, additionally includes a plate brace-like spring extending lengthwise of the leaf spring lamination, and a fastening assembly by means of which the springs of the leaf spring lamination and the plate brace-like spring are mechanically interconnected at their midportions.

Preferably, the fastening assembly of the elastic suspension of a wheeled vehicle is mechanically linked with the axle, or in the case of two adjacent axles, with the frame of the vehicle, the end portions of the plate brace-like spring being mechanically connected to the frame or to the corresponding axles of the vehicle.

Desirably, the elastic suspension of a wheeled vehicle additionally includes two shackles with one end of each shackle pivotably connected to the end of a corresponding end portion of the plate brace-like spring the other end of each such shackle being connected to the frame or corresponding axle of the vehicle.

Advisably, the elastic suspension of a wheeled vehicle includes a fastening assembly which contains three clamping elements disposed one above another and drawn together, the length of each clamping element being smaller than the length of the midportion of the plate brace-like spring, whereas the outer surface of each extreme clamping element has a longitudinal groove, one such groove has a width corresponding to the thickness of the plate bracelike spring, the width of the other longitudinal groove corresponding to the width of the lamination of leaf springs, the two surfaces of the middle clamping element also having longitudinal grooves, the width of one such groove corresponding to the thickness of the plate brace-like spring, whereas the width of the other longitudinal groove corresponds to the width of the leaf spring lamination, each of these latter grooves being disposed in front of the groove of the respective extreme clamping element.

The present invention ensures the provision of a predetermined non-linear resilient characteristic of the suspension to result in improved riding characteristics of the vehicle.

Desirably, the elastic suspension of a wheeled vehicle according to the invention additionally comprises two shackles with one end of each such shackle pivotably connected to the end of the corresponding end portion of the plate brace-like spring, the other end being connected to the frame or to the corresponding axles of the vehicle.

The invention also ensures absorption of dynamic loads exerted on the vehicle to result in a wider range of functional capabilities of the elastic suspension of a wheeled vehicle.

The invention further enables to considerably reduce the number of springs in the leaf spring lamination, whereby the amount of metal consumed for the fabrication of the suspension of a wheeled vehicle is substantially reduced.

In addition, the invention requires less labour to be consumed for the fabrication of the elastic suspension of a wheeled vehicle.

DESCRIPTION OF THE PREFERRED EMBODIMENT

Other objects and attending advantages of the invention will become more fully apparent from a more detailed description of specific embodiments thereof taken in conjunction with the accompanying drawings, in which.

BEST MODE OF CARRYING OUT THE INVENTION

Figure 1:
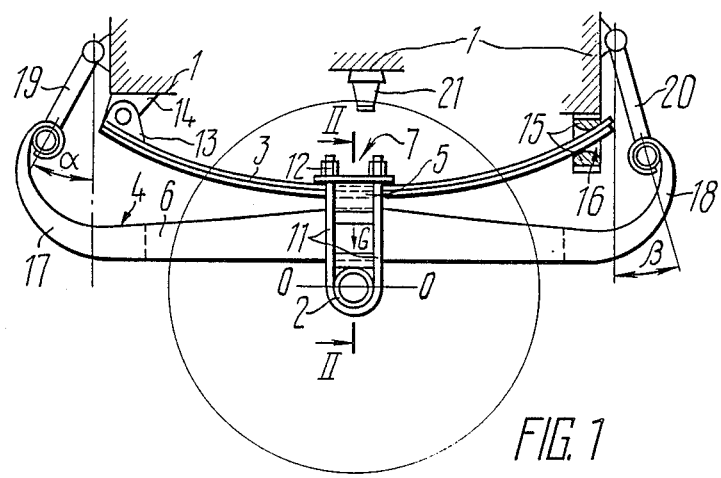
FIG. 1 is a general view of an elastic suspension of a wheeled vehicle according to the invention.

An elastic suspension of a wheeled vehicle having a frame 1 (FIG. 1) and an axle 2 comprises a lamination 3 of leaf springs (two such springs in the case under discussion), and a plate brace-like spring 4, midportions 5 and 6 of these springs 3 and 4, respectively, being rigidly interconnected by means of a fastening assembly indicated generally at 7. The fastening assembly 7 (FIGS. 1 and 2) includes clamping elements 8, 9 and 10 arranged one above another and extending for a length substantially shorter than the length of the midportion 6 of the spring 4. The surfaces of the elements 8 and 9 facing each other are provided with longitudinal grooves of a width corresponding to the thickness of the spring 4, these grooves being adapted to receive the midportion 6 of the spring 4. The surfaces of the elements 9 and 10 facing each other are also provided with longitudinal grooves of a width corresponding to the width of the spring lamination 3, these grooves accommodating the midportion 5 of the springs 3. The element 8 overlies the axle 2. The elements 8, 9 and 10, as well as the spring lamination 3 and spring 4 are drawn together by U-bolts 11 and tightened by nuts 12. Attached to one end of the lamination of springs 3 (FIG. 1) is a lug 13 pivotably connected to a bracket 14, which is rigidly affixed to the frame 1. The opposite end of the spring lamination 3 is interposed between shaped supports 15 of a bracket 16 also rigidly affixed to the frame 1. Connected pivotably to the ends of end portions 17, 18 of the spring 4 are ends of shackles 19 and 20, respectively. Other ends of the shackles 19 and 20 are pivotably connected to the frame 1. The shackles 19 and 20 depart to the angles $\alpha$ and $\beta$ from the vertical, when the suspension is unloaded. Connected to the frame 1 above the fastening assembly 7 is a rebound bumper 21. The wheel of the vehicle is represented by the dash-dot line. In the free state of the suspension the axis of the wheel coincides with the lateral axis of the axle 2 levels at the line O—O.

Figure 2:
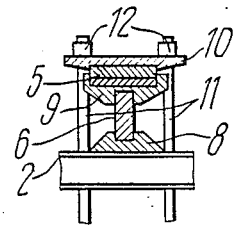
FIG. 2 is a cross-section taken along the line II—II in FIG. 1.
Figure 3:
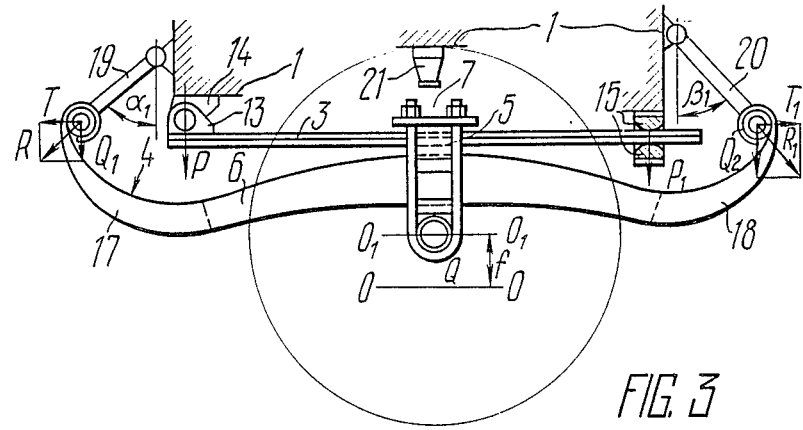
FIG. 3 is a general view of the elastic suspension of a wheeled vehicle as shown in FIG. 1 when a static load is exerted thereon.

FIG. 3 represents the elastic suspension of a vehicle shown in FIG. 1 under a static load, when the shackles 19 and 20 depart from the vertical to the angles $\alpha_1$ and $\beta_1$, respectively. The axis of the wheel (i.e, the lateral axis of the axle 2) levels at the line $O_1$—$O_1$ passing at a distance f determined by the magnitude of static deflection of the spring lamination 3 and spring 4 from the line O—O.

Figure 4:
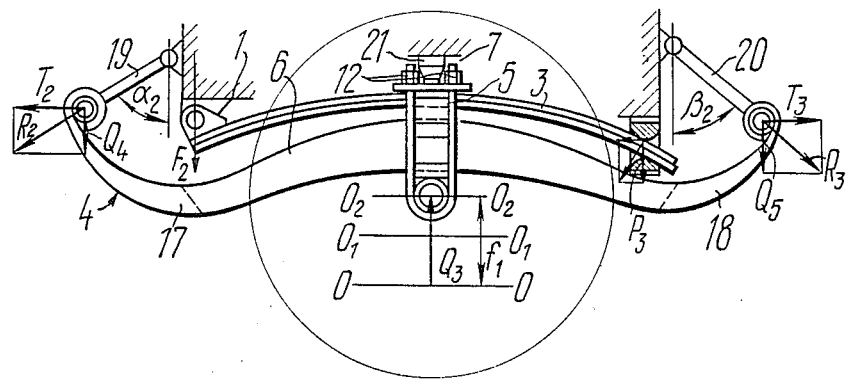
FIG. 4 is a view of the elastic suspension of a wheeled vehicle as shown in FIG. 1, when the maximum dynamic load is exerted thereon.

FIG. 4 illustrates the elastic suspension of a vehicle according to FIG. 1, when dynamic loads are exerted thereon and the shackles 19 and 20 depart from the vertical to the angles $\alpha_2$ and $\beta_2$, respectively. The axis of the wheel (i.e., the lateral axis of the axle 2) levels at the line $O_2$—$O_2$ passing at a distance $f_2$ determined by the magnitude of the dynamic deflection of the spring lamination 3 and spring 4 from the line O—O.

Figure 5:
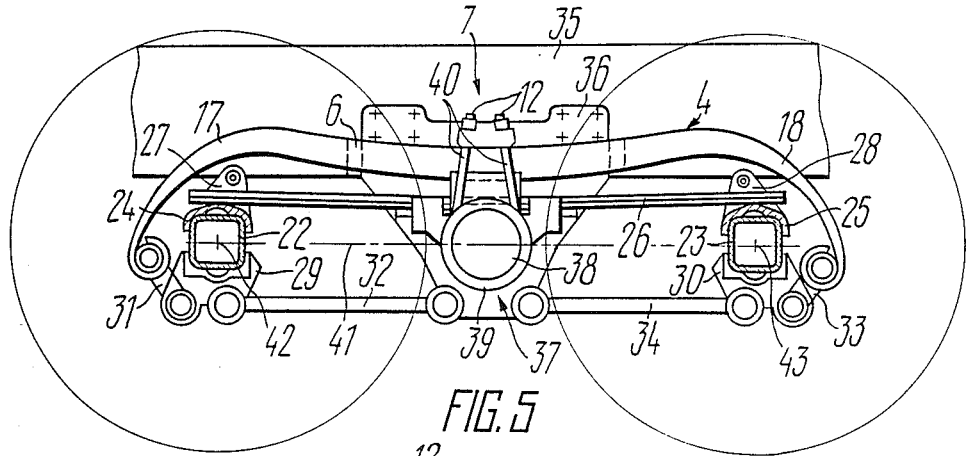
FIG. 5 is a general view of the proposed elastic suspension of a wheeled vehicle having two adjacent axles.
Figure 6:
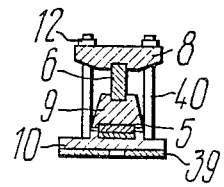
FIG. 6 is a cross-section taken along the line VI—VI in FIG. 5.

According to another embodiment of the elastic suspension of a wheeled vehicle provided with two adjacent axles 22 and 23 (FIG. 5) having spacers 24 and 25, respectively, ends of a spring lamination 16 bear on these spacers 24 and 25. Connected to the spacers 24 and 25 are limiting stops 27 and 28. Brackets 29 and 30 are attached to the axles 22 and 23. Connected pivotably to the bracket 29 are ends of shackle 31 and rod 32, whereas connected pivotably to the bracket 30 are ends of shackle 33 and rod 34. Other ends of the shackles 31 and 33 are pivotably connected to the ends of the end portions 17, 18 of the spring 4. A bracket 36 is attached to a frame 35, whereas the rods 32 and 34 are pivotably connected to the bracket 36. The bracket 36 has attached thereto a balancer 37 having a shaft 38 embraced by a shoe element 39. The spring 4 and the spring lamination 3, as heretofore described, as well as the shoe 39 of the balancer 37, are drawn together by the fastening assembly 7 (FIG. 5). The fastening assembly 7 is fashioned as aforedescribed, but the element 10 (FIG. 6) bears on the shoe element 39 to be clamped together with the springs 3, element 9, spring 4 and element 8 (arranged one above another) by pins 40 tightened by the nuts 12. In the static state of the vehicle the geometrical line 41 connecting centers 42 and 43 of the respective axles 22 and 23 is parallel with the plane of movement thereof along a smooth road surface.

The elastic suspension of a wheeled vehicle with reference to FIGS. 1, 2, 3 and 4 operates in the following manner.

When unloaded, the suspension is subject only to the action of the force of gravity of the spring lamination 3, plate brace-like spring 4, fastening assembly 7, and axle 2 (forces arising due to tightening the nuts 12 not being considered). Therewith, the deflection angles $\alpha$ and $\beta$ of the shackles 19 and 20 are at the minimum and almost equal in magnitude. A small difference in these angles $\alpha$ and $\beta$, and in the length of the shackles 19 and 20 is dictated by the kinematics of the suspension. During operation the spring lamination 3 is capable of not only pivoting about the axis of the lug 13, but also of moving longitudinally relative to the bracket 16.

In the static state, that is under the action of the weight of the fully laden vehicle, the springs of the spring lamination 3 straighten to almost horizontal, whereas the plate brace-like spring 4 deforms. The movement or deflection of the suspension equals the distance $f_1$, and inclination angles $\alpha$ and $\beta$ of the shackles 19 and 20 increased to $\alpha_1$ and $\beta_1$ respectively.

Reaction Q of the road surface is balanced by the force of gravity G (FIG. 1), reactions P and $P_1$ (FIG. 3) of the spring lamination 3, and by the vertical components $Q_1$ and $Q_2$ of the bearing reactions R and $R_1$ of the spring 4, the horizontal components of the reactions R and $R_1$ being T and $T_1$, respectively.

During the dynamic, that is the maximum deflection $f_1$ (FIG. 4), the spring lamination 3 and the plate brace-like spring 4 deflect to the frame 1 of the vehicle until the element 10 (FIG. 3) of the fastening assembly 7 is thrust against the rebound bumper 21. The inclination angles $\alpha_2$ (FIG. 4) and $\beta_2$ of the shackles 19 and 20 are at the maximum. Accordingly, the aforedescribed vertical loads Q, $Q_1$, $Q_2$ change to $Q_3$, $Q_4$, $Q_5$, and P and $P_1$ change to $P_2$ and $P_3$, whereas the horizontal components T and $T_1$ of the bearing reactions R and $R_1$ of the spring 4 exerted on the suspension change to $T_2$ and $T_3$ at the bearing reactions $R_2$ and $R_3$ to reach the maximum values.

One feature of the proposed suspension is that when the total loads exerted thereon vary, the bearing reactions $R_2$ and $R_3$ are changed both in magnitude and direction.

Therefore, the stresses in the cross-sections of the plate brace-like spring 4 vary, depending on the load Q, according to non-linear parameters. Consequently, the rigidity of the proposed suspension also changes according to non-linear coefficients, which in turn determines the non-linearity of its resilient characteristics.

The elastic suspension of a vehicle having two adjacent axles 22 and 23 (FIG. 5) operates substantially as heretofore described, when the vehicle moves on a smooth road.

When the vehicle moves along a road with surface irregularities or when overcoming bumps and holes, the proposed suspension can exhibit the inherent equilibrium capacity, that is it can change the angle of the geometrical line 41 to ensure continuous contact of the wheels with the road surface. The wheel of the axle 22, for example, can elevate to a certain height as compared with the position thereof illustrated in FIG. 5, whereas the wheel of the axle 23 can lower to approximately the same magnitude. Therewith, the loads acting on the wheels are equalized to remain substantially equal, that is the wheels are balanced relative to the axis 38 of the balancer 37. This is accompanied by the spring lamination 26 and the brace-like spring 4 with the fastening assembly 7 and shoe 39 of the balancer 37 turn as a unit relative to the axis 38 of the balancer 37 to the angle at which the line 41 departs from its static position. Simultaneously, the rods 32 and 34 tend to pivot to angles equal in magnitude but different in sign. This position is maintained until the line 41 returns to its static position. The traction and brake forces are taken up by the rods 32 and 34, as well as by the spring 4, to be therefore transmitted to the frame 35 through the bracket 36. The forces acting on the wheel in a direction perpendicular to the plane of movement of the vehicle are transmitted from the limiting stops 27 and 28 to the side surface of the spring lamination 26 to be taken up by the frame 35 through the fastening assembly 7, show 39 and bracket 36.

According to the invention, the length of each clamping element 8 (FIGS. 2 and 6), 9 and 10 of the fastening assembly 7 (FIGS. 1 and 3) is less than the length of the midportion 6 (FIGS. 1, 4, 5) of the spring 4. Accordingly, the provision of the fastening assembly 7 influences but negligibly the deflection of the spring 4 under the action of the vertical force exerted thereon.

The invention allows simplification of the assembly of the suspension.

In addition, the invention ensures that a smaller amount of metal is required for fabricating the suspension, while improving the riding performance of the vehicle in general.

The invention can find application in any wheeled vehicle, such as car, truck, or truck trailer, where dynamic loads exerted on the wheels need absorption.

We claim:

1. An elastic suspension of a wheeled vehicle comprising a frame with at least one axle including a lamination of springs interposed between the frame and axle and mechanically connected thereto, a plate brace-like spring (4) extending lengthwise of the leaf spring lamination (3), and a fastening assembly (7) by means of which the springs of the leaf spring lamination (3) and the plate brace-like spring (4) are mechanically interconnected at their midportions (5,6).

2. A suspension as claimed in claim 1, wherein the fastening assembly (7) is mechanically linked with the axle (2), end portions (17,18) of the plate brace-like spring (4) being mechanically connected to the frame (1) of the vehicle.

3. A suspension as claimed in claim 2, further comprising two shackles (19, 20) with one end of each such shackle pivotably connected to the end of a corresponding end portion (17, 18) of the plate brace-like spring (4), the other end of each shackle being connected to the frame (1) of the vehicle.

4. A suspension as claimed in any of the claims 1–3, wherein the fastening assembly (7) contains three clamping elements (8,9,10) disposed one above another and drawn together, the length of each clamping element being smaller than the length of the midportion (6) of the plate brace-like spring (4), whereas the inner surface of each extreme clamping element (8,10) has a longitudinal groove, one such groove has a width corresponding to the thickness of the plate brace-like spring (4), the width of the other longitudingal groove corresponding to the width of the lamination (3) of leaf springs, the two surfaces of the middle clamping element (9) also having longitudinal grooves, the width of one such groove corresponding to the thickness of the plate brace-like spring (4), whereas the width of the other longitudinal groove corresponds to the width of the leaf spring lamination (3), each of these latter grooves being disposed in front of the groove of the respective extreme clamping element (8 and 10).

5. A suspension as claimed in claim 1, wherein at least two adjacent axles are provided, and wherein the fastening assembly (7) is mechanically linked with the frame (35) of the vehicle, and end portions (17, 18) of the plate brace-like spring (4) are mechanically connected to corresponding axles (22 and 23).

6. A suspension as claimed in claim 2, wherein at least two adjacent axles are provided, and further comprising two shackles (31, 33) with one end of each such shackle pivotally connected to the end of a corresponding end portion (17, 18) of the plate brace-like spring (4), the other end of each shackle being connected to the corresponding axles (22, 23).

* * * * *